United States Patent Office 3,227,671
Patented Jan. 4, 1966

3,227,671
AQUEOUS SOLUTION OF FORMALDEHYDE AND CATIONIC THERMOSETTING POLYAMIDE-EPICHLOROHYDRIN RESIN AND PROCESS OF MAKING SAME
Gerald I. Keim, West Grove, Pa., assignor to Hercules Powder Company, Wilmington, Del., a corporation of Delaware
No Drawing. Filed May 22, 1962, Ser. No. 196,583
8 Claims. (Cl. 260—29.2)

This invention relates to stable solutions of cationic thermosetting polyamide-epichlorohydrin resins and to a method of preparing same.

It has been found that certain cationic thermosetting resins formed by reacting a polyamide of a polyalkylene polyamine and a dicarboxylic acid selected from the group consisting of diglycolic acid and saturated aliphatic dicarboxylic acids with epichlorohydrin are very efficient wet-strength resins for paper. The resins have been stabilized by pH adjustment to the acid side as by the addition of an acid.

It has now been discovered that cationic polyamide-epichlorohydrin resins of the indicated type can be stabilized by adding small quantities of formaldehyde. The formaldehyde is preferably added at or near the end of the polymerization of the resin, preferably at a pH of about 4.0 Best results are obtained if the resin solution containing the formaldehyde is heated at 55° C. to 75° C., and preferably at 60° C. to 70° C., for up to about 1 hour. The resin may then be adjusted to pH 2.5–4.0 for storage.

In the preparation of these products, the dicarboxylic acid is first reacted with the polyalkylene polyamine, preferably in aqueous solution, under conditions such as to produce a water-soluble, long-chain polyamide containing the recurring groups

—NH(C$_n$H$_{2n}$HN)$_x$—CORCO— where $n$ and $x$ are each 2 or more and R is the divalent organic radical of the dicarboxylic acid. This long-chain polyamide is then reacted with epichlorohydrin to form water-soluble cationic thermosetting resins which are stabilized by the addition of formaldehyde, as generally described above and as more specifically described hereinafter.

The dicarboxylic acids contemplated for use herein are the saturated aliphatic dicarboxylic acids preferably containing from 3 to 8 carbon atoms, such as malonic, succinic, glutaric, adipic and so on, together with diglycolic acid. Of these, diglycolic acid and the saturated aliphatic dicarboxylic acids having from 4 to 6 carbon atoms in the molecule, namely, succinic, glutaric and adipic, are most preferred. Blends of two or more of these dicarboxylic acids may also be used, as well as blends of one or more of these with higher saturated aliphatic dicarboxylic acids, such as azelaic and sebacic, as long as the resulting long-chain polyamide is water soluble or at least water dispersible.

A variety of polyalkylene polyamines including polyethylene polyamines, polypropylene polyamines, polybutylene polyamines and so on may be employed herein of which the polyethylene polyamines represent an economically preferred class. More specifically, the polyalkylene polyamines of this invention are polyamines containing two primary amine groups and at least one secondary amine group in which the nitrogen atoms are linked together by groups of the formula —C$_n$H$_{2n}$— where $n$ is a small integer greater than unity and the number of such groups in the molecule ranges from two up to about eight, and preferably up to about four. The nitrogen atoms may be attached to adjacent carbon atoms in the group —C$_n$H$_{2n}$— or to carbon atoms further apart, but not to the same carbon atom. This invention contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a very satisfactory starting material. Most preferred are the polyethylene polyamines containing from two to four ethylene groups, two primary amine groups, and from one to three secondary amine groups.

The term "polyalkylene polyamine" employed in the claims, therefore, refers to and includes any of the polyalkylenepolyamines referred to above or to a mixture of such polyalkylene polyamines.

It is desirable, in some cases, to increase the spacing of secondary amine groups on the polyamide molecule in order to change the reactivity of the polyamide-epichlorohydrin complex. This can be accomplished by substituting an aliphatic diamine such as ethylenediamine, propylenediamine, hexamethylenediamine, or a heterocyclic diamine such as piperazine or the like for a portion of the polyalkylene polyamine. For this purpose, up to about 60% of the polyalkylene polyamine may be replaced by a molecularly equivalent amount of the diamine. Usually, a replacement of about 30% or less will serve the purpose.

The temperatures employed for carrying out the reaction between the dicarboxylic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures utilized and will ordinarily vary from about ½ to 2 hours, although shorter or longer reaction times, e.g., up to about 4 hours may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine to dicarboxylic acid of from about 0.9:1 to about 1.2:1, and preferably from about 0.92:1 to 1.14:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel, while mole ratios above 1.4:1 result in low molecular weight polyamides. Such products do not produce efficient wet-strength resins when reacted with epichlorohydrin.

In converting the aqueous polyamide, formed as above described, to a cationic thermosetting resin, it is reacted with epichlorohydrin at a temperature from about 45° C. to about 100° C., and preferably from about 45° C. to about 70° C., until the viscosity of a 25% solids solution at 25° C. has reached at least <B, and preferably at least D, on the Gardner-Holdt scale. Best results are obtained if, prior to reaction with epichlorohydrin, the pH of the polyamide solution is adjusted to from about 8.0 to about 9.5, and preferably to about 8.5 to about 9.0.

This, however, is not necessary to obtain good stability in accordance with the invention.

After the polymerization has been completed and the desired viscosity reached, the resin is treated with formaldehyde. The formaldehyde is preferably added before the resin is cooled to room temperature, although some improvement can be obtained by adding the formaldehyde to the cold resin. Best results are obtained by heating the resin at a pH from about 2.5 to about 4.0 after the addition of the formaldehyde. The temperature of heating may vary from room temperature, i.e., about 25° C. up to about 75° C., but will preferably be from about 60° C. to about 70° C.

The amount of formaldehyde required will usually vary from about 2% to about 15% by weight, based on the weight of resin solids. Amounts less than 2% usually do not give the desired degree of stabilization, while amounts above about 15% adversely affect the efficiency of the resin. The preferred range for formaldehyde addition is from about 3% to about 10% by weight, based on the weight of resin solids.

After the treatment with formaldehyde, the resin is cooled to about 25° C. and sufficient acid added to adjust the pH to about 4.0 or lower. Any suitable acid such as sulfuric, hydrochloric, nitric, phosphoric, formic, acetic and the like, or various combinations of these acids can be used for pH adjustment.

In the polyamide-epichlorohydrin reaction, it is preferred to use sufficient epichlorohydrin to convert all secondary amine groups to tertiary amine groups and/or quaternary ammonium groups including cyclic structures. However, more or less may be added to moderate or increase reaction rates. In general, it is contemplated utilizing from about 0.5 mole to about 1.8 moles of epichlorohydrin per mole polyamide secondary amaine. It is preferred to utilize from about 0.9 mole to about 1.5 moles of epichlorohydrin per mole of polyamide secondary amine group.

The polyamide-epichlorohydrin resins, prepared as herein described, may be incorporated into pulp slurry at any point on the wet end of the paper machine. They may also be used similarly to a tube size or applied at a size press or from showers to the dried or partially dried sheet. For most purposes, adequate wet strength may be obtained by incorporating in the paper from about 0.25% to about 3% of the resin, based on the dry weight of the pulp. However, in special cases, up to 5% or more may be used.

The following examples will illustrate the invention:

EXAMPLE 1

A polyamide was prepared as follows: One thousand and sixty-eight pounds of diethylenetriamine and 514 pounds of water were charged to a 500-gallon kettle equipped with an agitator. The agitator was started, and 1,550 pounds of adipic acid were added at the rate of 100 pounds per 6 minutes. After the acid was added, the temperature of the charge was raised to 190–195° C. and held there for 90 minutes. It was then cooled to 170° C., and 2,400 pounds of water were slowly added. The product was then cooled to 25° C. It contained 53.7% solids.

To 235.2 g. (126.4 g. dry basis) of this polyamide solution in a 3-necked, 1-liter, round-bottomed flask equipped with a thermometer and electric stirrer was added 420 g. of water. The soltion was heated with stirring to 50° C., and 62.0 g. of epichlorohydrin was added dropwise over a period of 12 minutes. The solution was heated to 60° C. and maintained between 60° C. and 63° C. until the viscosity of the product reached C (Gardner-Holdt scale at 25° C.). This required 75 minutes. Then 40 g. of 37% HcHO was added, and the pH of the sample was adjusted to 4.0 with 82 ml. of 10% $H_2SO_4$. The product was then divided into two equal parts: Part 1 was divided into 3 equal parts which were adjusted respectively to pH 3.5, 3.0, 2.5 with 10% $H_2SO_4$ and labeled 1, 2 and 3. Part 2 was heated to 65° C. for 1 hour and then divided into 3 parts and adjusted to pH 3.5, 3.0, 2.5 and labeled 4, 5 and 6. These samples were stored at room temperature and observed periodically until gelation occurred. Results are given in Table 1 below.

*Table 1*

| Sample | pH | Initial Viscosity | Total Solids | Treatment | Storage Stability |
| --- | --- | --- | --- | --- | --- |
| 1 | 3.5 | <C | 22.3 | HcHO added but no added cooking. | Gelled in 60 da. |
| 2 | 3.0 | <C | 22.1 | | Gelled in 93 da. |
| 3 | 2.5 | <C | 21.9 | | <J in 117 da. |
| 4 | 3.5 | C | 22.4 | HcHO added and resin cooked 1 hr. at 65° C. | Gelled in 115 da. |
| 5 | 3.0 | C | 22.2 | | >C in 117 da. |
| 6 | 2.5 | C | 22.0 | | B in 117 da. |

EXAMPLE 2

Example 1 was repeated except that the resin was polymerized to a Gardner viscosity of D. The results are given in Table 2 below.

*Table 2*

| Sample | pH | Initial Viscosity | Total Solids | Treatment | Storage Stability |
| --- | --- | --- | --- | --- | --- |
| 1 | 3.5 | D | 22.7 | HcHO added but not cooked. | Gelled in 37 da. |
| 2 | 3.0 | D | 22.5 | | Gelled in 60 da. |
| 3 | 2.5 | D | 22.3 | | Gelled in 75 da. |
| 4 | 3.5 | >D | 22.8 | HcHO added, cooked 1 hr. at 65° C. | Gelled in 75 da. |
| 5 | 3.0 | >D | 22.6 | | >G viscosity after 115 da. |
| 6 | 2.5 | >D | 22.4 | | >B viscosity after 115 da. |

EXAMPLE 3

Example 2 was repeated except that no formaldehyde was added and only three samples labeled 1, 2 and 3 were prepared. The results are given in Table 3 below.

*Table 3*

| Sample | pH | Initial Viscosity | Total Solids | Treatment | Storage Stability |
|---|---|---|---|---|---|
| 1 | 3.5 | D | 23.3 | No HcHO added | Gelled in 6 da. |
| 2 | 3.0 | D | 23.5 | | Gelled in 6 da. |
| 3 | 2.5 | D | 23.7 | | Gelled in 8 da. |

EXAMPLE 4

A polyamide was prepared as follows: Three hundred g. (2.91 moles) of diethylenetriamine and 150 g. of water were placed in a 3-necked flask equipped with a mechanical stirrer, thermometer and condenser. To this was added 435 g. (3.0 moles) of adipic acid in six portions at one-minute intervals. The solution was then heated to 167° C. in 85 minutes and maintained at this temperature for three hours. The product was cooled to 140° C., and 600 ml. of water was cautiously added after which it was cooled to 25° C. and bottled. The product contained 57.7% solids.

A cationic resin was prepared utilizing the following ingredients:

218.4 g. of polyamide resin prepared as above described
200.0 g. water
62.0 g. epichlorohydrin
40.0 g. 37% formaldehyde The polyamide and water were charged to a 3-necked, round-bottomed, 1-liter flask equipped with thermometer and stirrer and heated to 50° C. The epichlorohydrin was added dropwise over a period of 5 minutes, and the charge was then heated to 60° C. until the viscosity of the resin reached C (Gardner). This required 55 minutes. Then 40 g. of 37% HcHO was added and the pH was lowered to 4.0 with 50 ml. of 10% $H_2SO_4$. The resin was then divided into three parts which were adjusted to pH 3.5, 3.0, 2.5, respectively. These samples were stored at 25° C. and observed periodically. Results are given in Table 4 below.

*Table 4*

| Sample | pH | Total Solids | Initial Viscosity | Viscosity After 112 days at 25° C. |
|---|---|---|---|---|
| 1 | 3.5 | 28.8 | A | 0 |
| 2 | 3.0 | 28.6 | A | <F |
| 3 | 2.5 | 27.9 | A | <C |

EXAMPLE 5

A cationic resin was prepared utilizing the following ingredients:

218.4 g. of polyamide resin prepared as in Example 4
290.0 g. water
62.0 g. epichlorohydrin
40.0 g. 37% formaldehyde The polyamide and water were charged to the polymerization flask and heated to 50° C. The epichlorohydrin was added dropwise over a period of 4 minutes. The charge was heated to 60° C. and held there until the viscosity of the resin reached E (Gardner). This required 100 minutes. To the product was added 40 g. of 37% HcHO. The pH of the resin was adjusted to 4.0 with 2.5 ml. of concentrated $H_2SO_4$. The resin was cooled to 25° C. and divided into three parts. These were adjusted to pH 3.5, 3.0, 2.5, respectively, with concentrated $H_2SO_4$. The samples were then stored at 25° C. and observed periodically for gelation. Results are given in Table 5 below.

*Table 5*

| Sample | pH | Total Solids | Initial Viscosity | Days Required for Sample to Gel at 25° C. |
|---|---|---|---|---|
| 1 | 3.5 | 29.3 | E | 21 |
| 2 | 3.0 | 29.5 | E | 29 |
| 3 | 2.5 | 29.8 | E | 49 |

EXAMPLE 6

The resins from Examples 1, 2, 4 and 5 were evaluated in Tacoma bleached kraft pulp beaten to a Schopper-Riegler freeness of 750 cc. The resins were added to the dilute stock in the proportioner, and the pH was adjusted to 7.5 with sodium bicarbonate. The stock was formed into handsheets with a basis weight of 40 lbs./ream and dried on a drum drier to a moisture content of 5%. Part of the handsheets were given as extra cure of 1 hour at 105° C. The wet tensile strength of the paper was measured after soaking in distilled water for 2 hours. In each experiment, a resin prepared similarly except that no formaldehyde was included in its formulation was used as the control resin. Results are given in Table 6 below.

*Table 6*

RESIN FROM EXAMPLE 1

| Sample | Percent Resin Used Based on Dry Pulp Weight | Wet Tensile | |
|---|---|---|---|
| | | Uncured | Cured |
| 1 | 0.9 | 6.6 | 11.6 |
| 2 | 0.9 | 6.5 | 11.2 |
| 3 | 0.9 | 6.4 | 11.2 |
| 4 | 0.9 | 6.4 | 11.3 |
| 5 | 0.9 | 6.7 | 11.6 |
| 6 | 0.9 | 6.6 | 10.8 |
| Control | 0.9 | 6.7 | 10.9 |

RESIN FROM EXAMPLE 2

| 1 | 0.9 | 6.2 | 10.8 |
| 2 | 0.9 | 5.9 | 9.9 |
| 3 | 0.9 | 5.6 | 10.3 |
| 4 | 0.9 | 5.5 | 9.9 |
| 5 | 0.9 | 6.0 | 10.6 |
| 6 | 0.9 | 5.6 | 10.3 |
| Control | 0.9 | 5.4 | 9.7 |

RESIN FROM EXAMPLE 4

| 2 | 1.0 | 4.7 | 9.3 |
| Control | 1.0 | 5.5 | 9.1 |

RESIN FROM EXAMPLE 5

| 3 | 0.4 | 5.8 | 9.0 |
| Control | 0.4 | 4.8 | 8.0 |
| 3 | 1.0 | 7.5 | 12.1 |
| Control | 1.0 | 7.2 | 11.0 |

EXAMPLE 7

To a solution of 20.6 g. (0.2 mole) of diethylenetriamine in 10 ml. of water in a small resin kettle, fitted with thermometer, stirrer, distilling head and nitrogen inlet tube, was added in six approximately equal portions 30.4 g. (0.2 mole) of recrystallized diglycolic acid. After the sixth acid addition, the temperature, which had increased from about 50° C. to 95° C., was raised slowly to 148° C. by means of a Wood's metal bath held at 175° C. The reaction mixture was held at a temperature of 138° C. to 148° C. for 2½ hours under partial reflux, during which the theoretical amount of water was collected. The product was then diluted with 45 ml. of hot water and cooled. It contained 48.7% total solids and had an intrinsic viscosity of 0.111.

To 61.8 g. of this polyamide solution in a reaction vessel was added 102.83 g. of water. This solution was heated to 50° C. and 15.4 g. of epichlorodydrin was added dropwise over a period of 5 minutes. The temperature was raised to 70° C. and maintained between 65–70° C. until the viscosity of the resin reached D on the Gardner scale (measured at 25° C.). This required 105 minutes. Then 20 g. of 37% formaldehyde was added, and 1.1 ml. of concentrated sulfuric acid and the resin was cooled to room temperature. The product had a pH of 3.0 and contained 25.5% solids. The product was stable for more than three months at 25° C. and was an efficient wet-strength resin for paper.

It will thus be seen that the present invention provides aqueous solutions of cationic thermosetting polyamide-epichlorohydrin resins stabilized by a formaldehyde content from about 2% to about 15% by weight, based on the weight of resin solids, and a pH below about 4.0. While these resins have been shown herein to be particularly useful as wet-strength resins for paper, they have also been found to be useful in many other applications such as insolubilizing agents for water-soluble polymers, aids or assistants in the application of water-soluble and water-insoluble coating, impregnating and sizing materials to paper and the like, as bonding agents in the preparation of mineral fiber sheets, mats and the like and in the preparation of nonwoven fabrics, as an agent for preventing shrinkage and felting of wool, as an anchor coat for nonfibrous regenerated cellulose film, and so on.

This is a continuation-in-part of my copending application Serial No. 796,761, filed March 3, 1959, now abandoned.

What I claim and desire to protect by Letters Patent is:

1. A process for improving the storage stability of an aqueous solution of a cationic water-soluble thermosetting resin obtained by reacting a polyalkylene polyamine having two primary amine groups and from one to seven secondary amine groups with a $C_3$ to $C_8$ saturated aliphatic dicarboxylic acid in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5 to 1 to about 1.8 to 1 to form the water-soluble cationic thermosetting resin which comprises adding to the resin solution a small but stabilizing amount of formaldehyde, and then adjusting the pH of the resulting solution below about 4.0.

2. A process for improving the storage stability of an aqueous solution of a cationic water-soluble thermosetting resin obtained by reacting a polyalkylene polyamine having two primary amine groups and from one to seven secondary amine groups with a $C_3$ to $C_8$ saturated aliphatic dicarboxylic acid in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5 to 1 to about 1.8 to 1 to form the water-soluble cationic thermosetting resin which comprises adding to the resin solution from about 2% to about 15% by weight, based on the weight of resin solids, of formaldehyde, and then adjusting the pH of the resulting solution below about 4.0.

3. A process for improving the storage stability of an aqueous solution of a cationic water-soluble thermosetting resin obtained by reacting a polyalkylene polyamine having two primary amine groups and from one to three secondary amine groups with a $C_3$ to $C_8$ saturated aliphatic dicarboxylic acid in aqueous solution in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5 to 1 to about 1.8 to 1 to form the water-soluble cationic thermosetting resin which comprises heating the aqueous resin solution at a temperature from about 25° C. to about 75° C. and a pH of about 2.5 to about 4.0, with 2–15% by weight, based on the weight of resin solids, of formaldehyde, and then adjusting the pH of the resulting solution below about 4.0.

4. The process of claim 2 in which the dicarboxylic acid comprises adipic acid.

5. The process of claim 2 in which the dicarboxylic acid comprises a mixture of adipic acid with another saturated aliphatic dicarboxylic acid.

6. The process of claim 2 in which the dicarboxylic acid is diglycolic acid.

7. An aqueous solution of a cationic water-soluble thermosetting resin having improved storage stability and obtained by reacting a polyalkylene polyamine having two primary amine groups and from one to seven secondary amine groups with a $C_3$ to $C_8$ saturated aliphatic dicarboxylic acid in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5 to 1 to about 1.8 to 1 to form the water-soluble cationic thermosetting resin, said aqueous resin solution being stabilized by a small but stabilizing amount of formaldehyde, and a pH below about 4.0.

8. An aqueous solution of a cationic water-soluble thermosetting resin having improved storage stability and obtained by reacting a polyalkylene polyamine having two primary amine groups and from one to seven secondary amine groups with a $C_3$ to $C_8$ saturated aliphatic dicarboxylic acid in a mole ratio of from about 0.8 to about 1.4 of the former to about 1.0 of the latter to form a long-chain polyamide, and then reacting the polyamide with epichlorohydrin in a mole ratio of epichlorohydrin to secondary amine groups of said polyamide of from about 0.5 to 1 to about 1.8 to 1 to form the water-soluble cationic thermosetting resin, said aqueous resin solution being stabilized by a formaldehyde content from about 2 to about 15% by weight, based on the weight of resin solids, and a pH below about 4.0.

References Cited by the Examiner

UNITED STATES PATENTS

| | | | |
|---|---|---|---|
| 2,707,708 | 5/1955 | Wittcoff | 260—45.7 |
| 2,961,347 | 11/1960 | Floyd | 260—45.2 |

OTHER REFERENCES

Walker: "Formaldehyde," 2nd edition (1953), page 86.

LEON J. BERCOVITZ, *Primary Examiner.*

DONALD CZAJA, *Examiner.*